US 6,707,896 B2

(12) United States Patent
Kwon

(10) Patent No.: US 6,707,896 B2
(45) Date of Patent: Mar. 16, 2004

(54) PUBLIC TELEPHONE WITH AND METHOD FOR CASH PAYMENT FUNCTION

(75) Inventor: Hwang-Sub Kwon, 111-1303 Woosung 7th Apt., 5/4 615 Ilwon-dong, Gangnam-gu, Seoul (KR)

(73) Assignees: Hwang-Sub Kwon, Seoul (KR); Kovecom Co., Ltd., Seoul (KR)

( * ) Notice: Subject to any disclaimer, the term of this patent is extended or adjusted under 35 U.S.C. 154(b) by 235 days.

(21) Appl. No.: 09/753,460

(22) Filed: Jan. 4, 2001

(65) Prior Publication Data

US 2001/0053210 A1 Dec. 20, 2001

(30) Foreign Application Priority Data

Jun. 16, 2000 (KR) ......................................... 2000-33325

(51) Int. Cl.⁷ ............................................. H04M 17/00
(52) U.S. Cl. .................. 379/155; 379/143; 379/144.01; 379/144.05
(58) Field of Search ................................. 379/155, 143, 379/144.01, 144.05, 93.12, 93.22, 88.13, 91.01; 235/381; 705/43; 455/557

(56) References Cited

U.S. PATENT DOCUMENTS

| 5,008,927 A | * | 4/1991 | Weiss et al. ........... 379/110.01 |
| 5,796,832 A | * | 8/1998 | Kawan ........................ 380/270 |
| 6,081,791 A | * | 6/2000 | Clark ........................... 705/39 |

* cited by examiner

*Primary Examiner*—Curtis Kuntz
*Assistant Examiner*—Barry W Taylor
(74) *Attorney, Agent, or Firm*—Robert E. Bushnell, Esq.

(57) ABSTRACT

A public telephone with a cash payment function is connected to a server of a banking agency through a telephone network and verifies whether a card, such as a credit card, inserted by a user is available for the requested cash service and, as the result of the verification, provides an amount of money required by the user from a currency cassette, thereby facilitating the cash withdrawal for the user. Therefore, an operator can use an inexpensive telephone network, instead of an exclusive line, thereby reducing operational cost.

27 Claims, 6 Drawing Sheets

PUBLIC TELEPHONE WITH AND METHOD FOR CASH PAYMENT FUNCTION

CLAIM OF PRIORITY

This application makes reference to, incorporates the same herein, and claims all benefits accruing under 35 U.S.C. §119 from my application PUBLIC TELEPHONE HAVING DRAWING OUT CASH FUNCTION filed with the Korean Industrial Property Office on Jun. 16, 2000 and there duly assigned Ser. No. 33325/2000.

BACKGROUND OF THE INVENTION

1. Field of the Invention

The present invention relates to a public telephone and, more particularly, to a public telephone with a cash payment function, which is connected to a server of a banking agency through a telephone network and verifies whether a credit card inserted by a user is available and, as the result of the verification, provides an amount of money required by the user from a currency cassette, thereby facilitating the cash withdrawal of the user.

Further, the present invention relates to a public telephone with a cash payment function wherein an operator uses an inexpensive telephone network instead of an exclusive line, thereby reducing an operational cost thereof.

2. Description of the Related Art

A telephone, as a most representative communicating apparatus, may be classified into a telephone for domestic use, a telephone for business use and a public telephone. Recently, there is a growing tendency that various effective and convenient functions are additionally added to the telephone. Among them, the public telephone is provided for public users by a communication service provider. The conventional public telephone typically has only a communicating function.

Since a general commercial bank typically provides a service for customers only in a period of fixed hours(e.g., 09:30~16:30), it is difficult to satisfy a request of the customers for banking services during various periods of time(e.g., a 24-hour service or a late-night service). To solve the problem, most commercial banks provide a cash processing system for automatically performing cash handling operations associated with the banking services in a bank building or at a predetermined place, which is operated for 24 hours a day. However, since the cash processing system is typically designed to give first consideration to a cash paying function, the quality of such service can be lowered when considered as an aspect of a 24-hour banking service.

Further, there is also provided a cash processing system (e.g., cash dispenser:CD, automatic teller machine:ATM) such as at a convenience store which is open for 24 hours a day to provide the cash service. However, since the place for mounting the system is limited, there can be a limitation on the time and the place for providing the banking service to a user.

In addition, the cash processing system is typically connected to a server of the banking agency using an exclusive line. When referring to the banking agency in order to inquire as to whether a card inserted by the user is available, the cash processing system typically uses such an exclusive line.

Therefore, in such conventional cash processing system, there can exist some problems. In this regard, since the cash processing system is typically mounted at only a designated place, a great deal of effort and time can be required to find the place at which the cash processing system is mounted. Further, since the cash processing system is connected with the server of the banking agency through an exclusive line, the cost of which is expensive, an operator can be economically burdened with the cost.

SUMMARY OF THE INVENTION

It is, therefore, an object of the present invention to provide a public telephone with a cash payment function, which can be mounted at various places over a wide area, thereby providing convenience to the user.

It is another object of the present invention to provide a public telephone with a cash payment function having a lowered maintenance cost.

It is another object of the present invention to provide a public telephone with a cash payment function, which can be mounted at various transporting means such as a ship or an airplane, etc., whereby the user can receive the cash service in such transporting means.

To achieve the above objects and other advantages of the present invention, there is provided a public telephone with a cash payment function, including: an inputting part for inputting information which is necessary for a cash service function and a general public telephone function; a displaying part for displaying a present operating state of the public telephone and various information for the cash service function and for the general public telephone function; a printer for outputting information of a result of the cash service requested by a user; a card reader which reads various information from a card inserted into the public telephone and adjusts an amount charged in the card according to an amount of use of the public telephone; a communicating circuit which allows the public telephone to perform the telephone function and includes a communicating control part, a dual tone multiple frequency (DTMF) generating part, a modulating/demodulating part and a line matching part; an interfacing part for interfacing an input/output state between the card reader and the communicating circuit; a memory part for storing various information including programs for the public telephone; a telephone network controlling part for interfacing the communicating circuit with a telephone network; a central processing unit for controlling an operation of the public telephone while communicating with the interfacing part by a desired protocol, for connecting the public telephone to a server of a banking agency when the user selects a cash service function, for transmitting card information read by the card reader to the server of banking agency, and for controlling the cash paying device according to a response from the server of banking agency; and a cash paying device which performs a cash paying function by means of a controlling operation of the central processing unit.

In another aspect of the present invention, there is provided a public telephone with a cash payment function, including: an inputting part for inputting information which is necessary for a cash service function and a general public telephone function; a displaying part for displaying a present operating state of the public telephone and various information for the general public telephone function and for the cash service function; a printer for outputting information as to a result of the cash service requested by a user; a card reader which reads various information from a card inserted into the public telephone and adjusts an amount charged on the card according to an amount of use of the public telephone; a communicating circuit for allowing the public telephone to perform the telephone function and includes a communicating control part, a DTMF generating part, a modulating/demodulating part and a line matching part; an interfacing part for interfacing an input/output state between the card reader and the communicating circuit; a memory part for storing information including programs for the public telephone; a modem for modulating/demodulating information which is transmitted/received through a communicating network from/to the public telephone and also for controlling a transmitting/receiving state of the information; a communicating network controlling part for interfacing the modem with the communicating network; a telephone network controlling part for interfacing the communicating circuit with a telephone network; a central processing unit for controlling an operation of the public telephone while communicating with the interfacing part by a desired protocol, and for connecting the public telephone to a server of a banking agency when the user selects the cash service function, and for transmitting card information read by the card reader to the server of the banking agency, and for controlling a cash paying device according to a response from the server of banking agency; and a cash paying device for performing a cash paying function by means of a controlling operation of the central processing unit.

In a further aspect of the present invention, there is provided a public telephone with a cash payment function, including: an inputting part for inputting information which is necessary for a cash service function and a general public telephone function; a displaying part for displaying a present operating state of the public telephone and information for the general public telephone function and for the cash service function; a printer for outputting information as to a result of the cash service requested by a user; a card reader which reads information from a card inserted into the public telephone and adjusts an amount charged on the card according to an amount of use of the public telephone; a communicating circuit for allowing the public telephone to perform the telephone function and includes a communicating control part, a DTMF generating part, a modulating/demodulating part and a line matching part; an interfacing part for interfacing an input/output state between the card reader and the communicating circuit; a memory part for storing information including programs for the public telephone; a wireless modem for modulating/demodulating voice data and card information which are transmitted/received through an antenna from/to the public telephone and the server of a banking agency, and for controlling a transmitting/receiving state of the information through the antenna; a central processing unit for controlling an operation of the public telephone while communicating to the interfacing part by means of a desired protocol, for connecting the public telephone to a server of the banking agency when the user selects a cash service function, for transmitting card information read by the card reader to the server of banking agency, and for controlling a cash paying device according to a response from the server of banking agency; and a cash paying device for performing a cash paying function by a controlling operation of the central processing unit.

Preferably, the cash paying device desirably includes: a controlling part for controlling a cash paying operation while communicating with the central processing unit, at least one currency cassette and a counting part for picking up and counting bills stored in the currency cassette and for discharging the counted bills.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
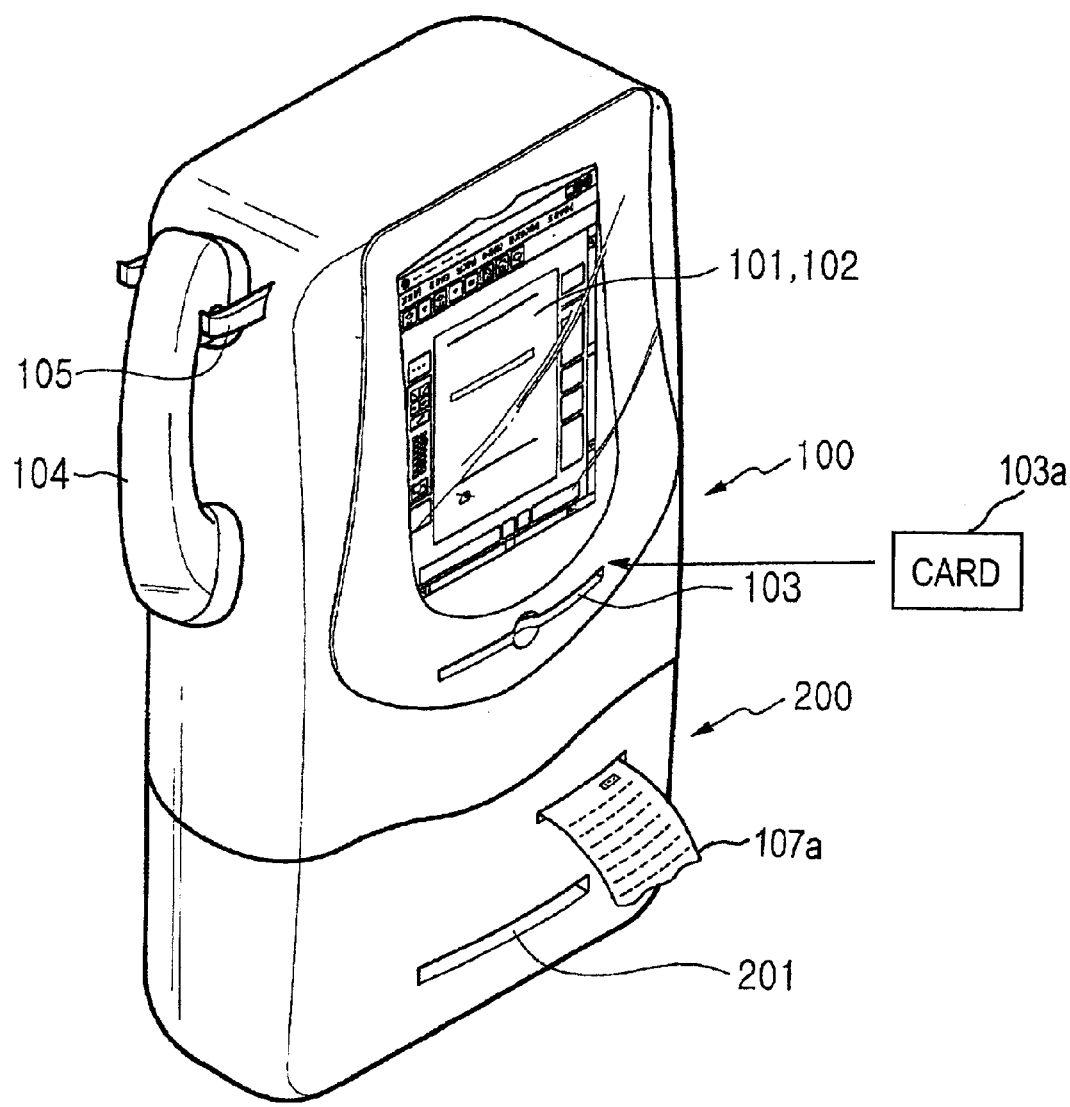
FIG. 1 is a perspective view of a public telephone with a cash payment function according to the present invention.
Figure 2:
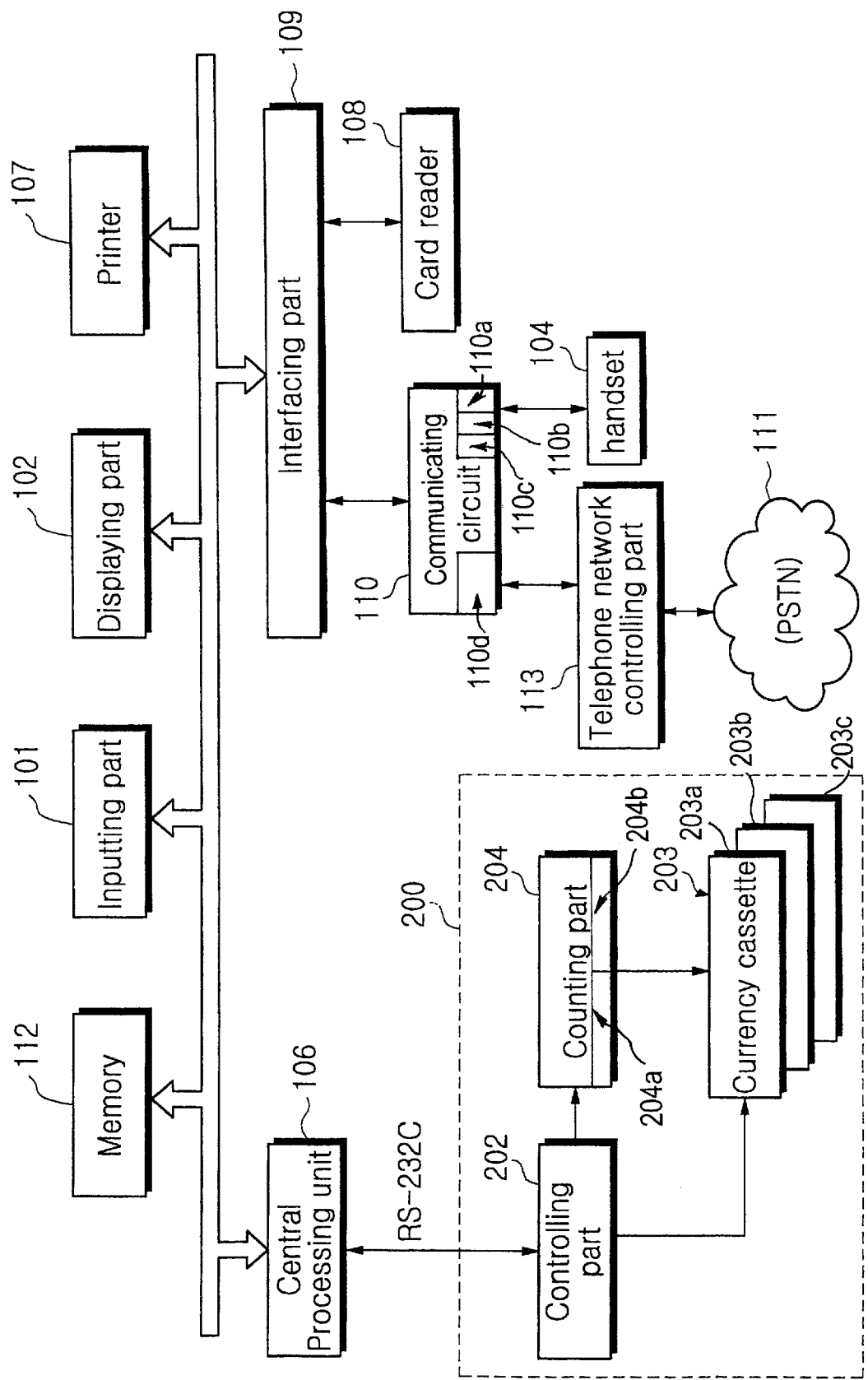
FIG. 2 is a block diagram showing a structure of a first embodiment of the public telephone with a cash payment function according to the present invention.

The present invention now will be described more fully hereinafter with reference to the accompanying drawings, in which exemplary preferred embodiments of the invention are shown. Referring to FIGS. 1 and 2, a public telephone 100 with a cash payment function according to the present invention includes an inputting part 101 and a displaying part 102 which are integrally disposed on a front face of the public telephone 100 to perform an inputting function and a displaying function, respectively, a card slot 103 which is disposed at a lower portion of the inputting and displaying parts 101, 102 in which a card 103a (e.g., a phonecard, a credit card, a debit card, etc.) is inserted, and a handset 104 which is hung on a hook 105 at a side of the public telephone 100.

Further, a bill paying or bill discharging device 200 is provided at a lower portion of the public telephone 100 below the card slot 103 for receiving a card 103a. At a desired portion of the bill paying device 200, there is formed a bill discharging port 201 for discharging the bills.

Referring to FIG. 2, in the public telephone 100, there is provided a central processing unit 106 for controlling each constituent part of the public telephone 100 according to a desired program. Particularly, the central processing unit 106 is connected through a public switched telephone network(PSTN) 111 to a server of a banking agency, determines whether a card inserted by a user is available, and then transmits information as to an amount of money requested by a user to a controlling part 202 by way of series communication.

The inputting part 101 transmits input information selected by the user to the central processing unit 106. Here, a key board or a touch screen may be used as the inputting part 101.

The displaying part 102 shows a present operating state of the public telephone 100 and, if necessary, may show a guiding message and an advertising message. A liquid crystal display panel is generally used as the displaying part 102. However, the displaying part 102 is not limited to a liquid crystal display panel, and various displaying devices can be used.

A printer 107 prints information relating to a cash service for a cash service function on a receipt 107a according to a controlling operation of the central processing unit 106, and then discharges the receipt. Preferably, a thermal printer or a dot printer is used as the printer 107, taking the dimensions of the public telephone 100 into consideration.

A card reader 108 reads the card 103a, such as a credit card, debit card or a phonecard, that is inserted into the public telephone 100 to check whether the card is available, and then adjusts the amount of money charged in or to the card 103a according to the use of the public telephone 100, and also, when necessary, transmits information of the used amount to the server of the banking agency to allow the banking agency to demand the payment for the amount used.

Continuing with reference to FIGS. 1 and 2, an interfacing part 109 interfaces an input/output state of various data, according to the operations of the card reader 108, with a communicating circuit 110, while communicating with the central processing unit 106 by means of a desired protocol. That is, the interfacing part 109 transmits information from the card 103a read by the card reader 108 to the central processing unit 106 to form a communicating or communication line. Therefore, the amount stored in or to the card 103a is adjusted by the amount used and a new amount is thus recorded in or for the card 103a. Further, other operations related to the card 103a for the cash service function are performed. Also, the interfacing part 109 controls an on/off state of a loop of the telephone network or PSTN 111 through a telephone network controlling part 113 and through the communicating circuit 110, and also controls a dual tone multiple frequency (DTMF) generating part 110a to form a communication line for generating a DTMF signal corresponding to a telephone number. The telephone network controlling part 113 interfaces communication between the public telephone 100 and the telephone network 111.

Again referring to FIGS. 1 and 2, a memory 112 stores various programs for the central processing unit 106 and various guiding messages to be displayed through the displaying part 102. The communicating circuit 110 includes a communicating control part 110b for performing a communicating function of the public telephone 100, the DTMF generating part 110a, a modulating/demodulating part 110c and a line matching part 110d. The handset 104 transmits a voice of the user through a microphone of the handset 104 to the communicating circuit 110 and simultaneously outputs a voice signal received through the telephone network 111.

Continuing with reference to FIG. 2, a structure of the bill paying or bill discharging device 200 according to the present invention is illustrated. The bill paying or bill discharging device 200 includes a controlling part 202 connected through an RS-232C communicating cable with the central processing unit 106 of the public telephone 100 to mutually receive and transmit control signals and data by way of serial communication, and to control the entire operation of the bill paying or bill discharging device 200.

The bill paying or bill discharging device 200 also includes a currency cassette 203 and counting part 204. The currency cassette 203 is divided into various sections 203a, 203b, 203c by monetary unit. One or more cassettes are provided to store a plurality of bills according to the monetary unit of the bills. The stored bills are transferred to the counting part 204 by the control of the controlling part 202. The counting part 204 counts the number of bills stored in the currency cassette 203 to correspond to the amount of money requested by the user, and then discharges the counted bills through the bill discharging port 201 to the outside of the public telephone 100.

Figure 3:
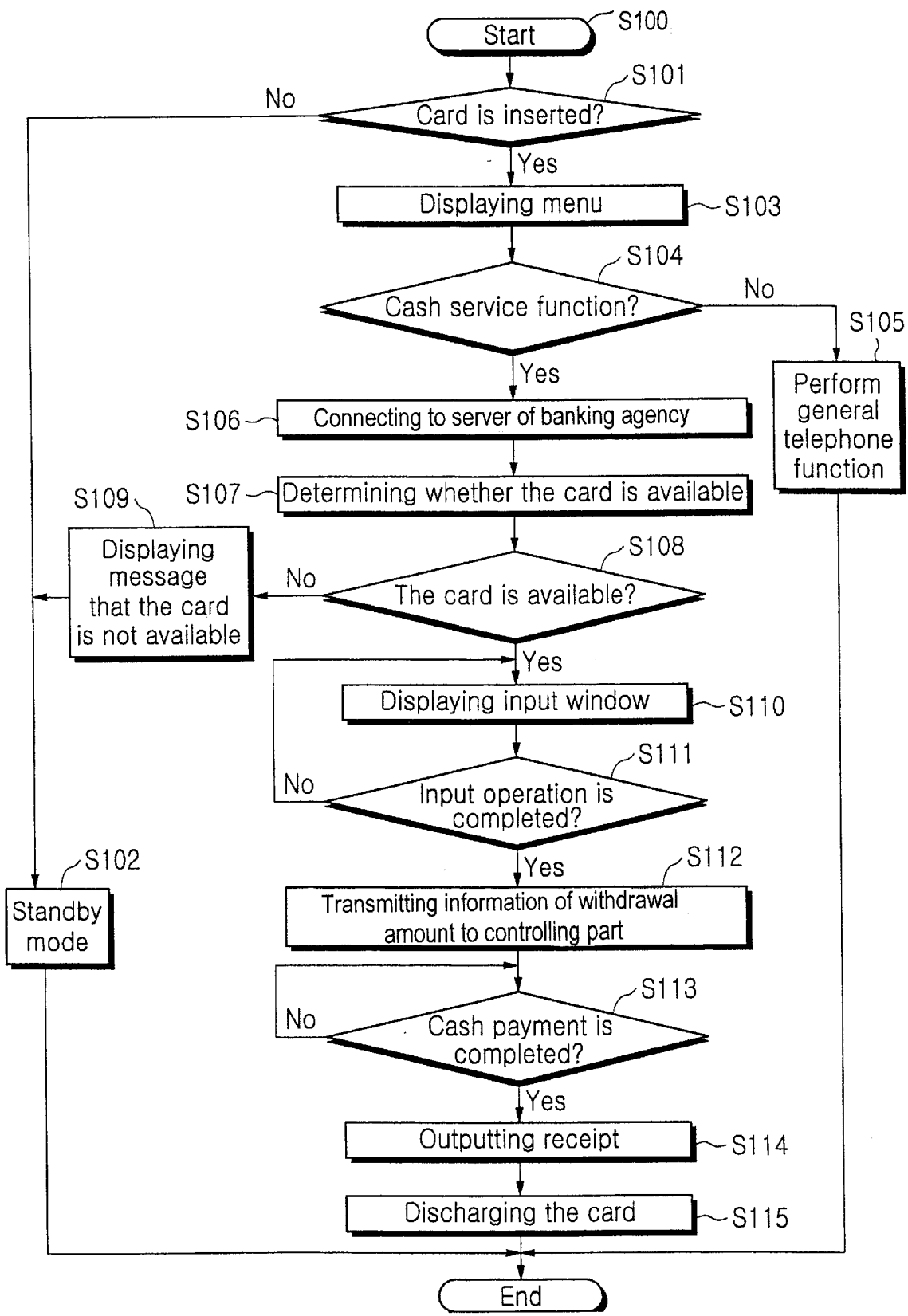
FIG. 3 is a flow chart showing an operational state of a central processing unit of FIG. 2.
Figure 4:
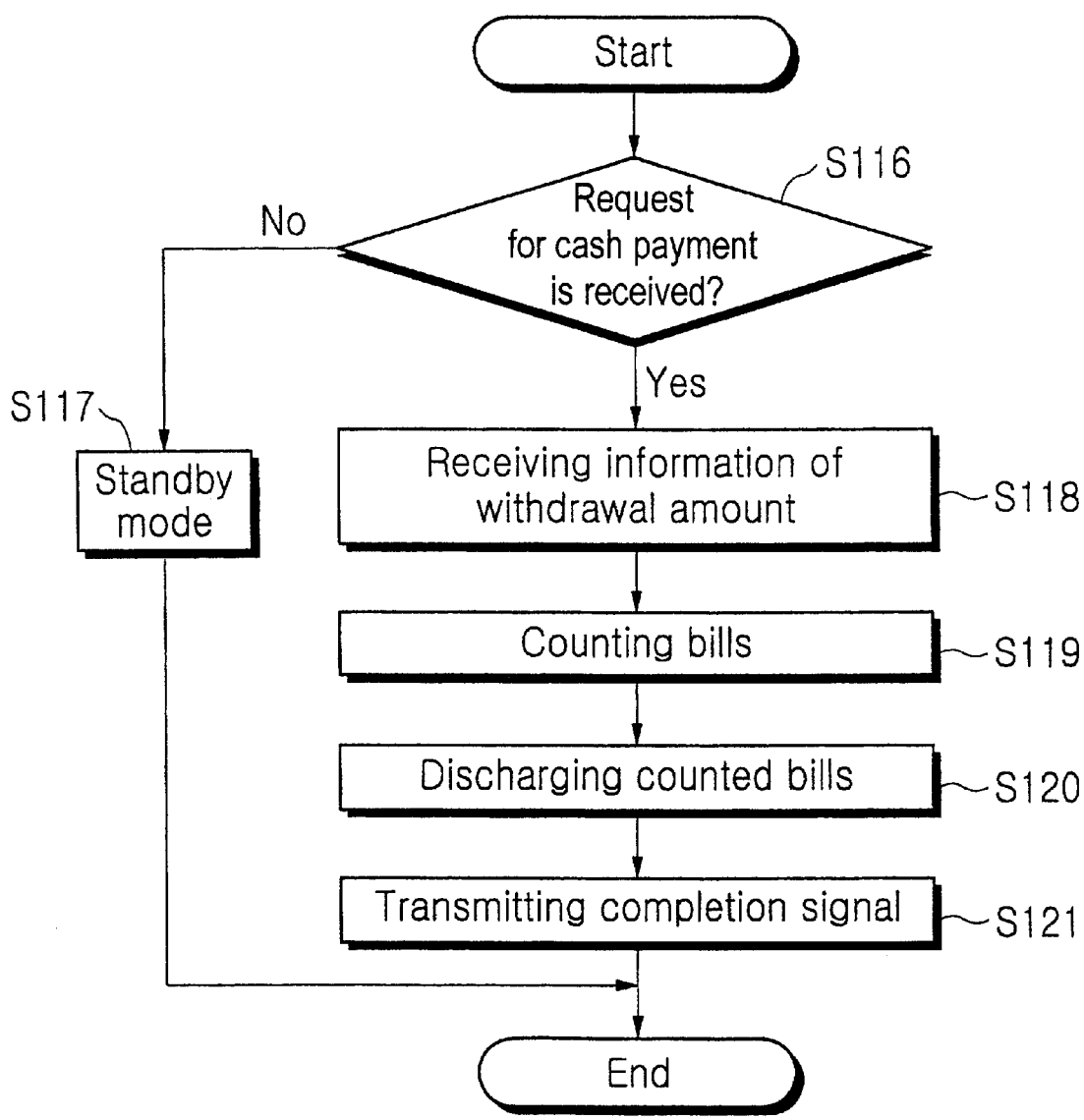
FIG. 4 is a flow chart showing an operational state of a control part of FIG. 2.

Referring now to FIGS. 3 and 4, as well as to FIGS. 1 and 2, the operation of the public telephone 100 according to the present invention will be described more fully. The process starts at step S100. Then the central processing unit 100 determines whether the card 103a is inserted through the card slot 103 as step S101. If the card 103a is not inserted, the process proceeds to step S102 and the public telephone 100 is maintained in a standby mode by the central processing unit 106. If the card 103a is inserted into the card slot 103 of the public telephone 100, the process proceeds to step S103 and the central processing unit 106 detects menu information stored in the memory 112 and displays the detected menu items through the displaying part 102 at step S103. Therefore, the user can select one or more of the functions of the general public telephone and the cash service function. The central processing unit 106 determines whether the cash service function is selected out of the various functions of the public telephone 100 at step S104.

In Step S104, if it is determined that the cash service function is not selected, the process proceeds to step S105, and the central processing unit 106 controls the public telephone 100 to perform the general public telephone function at step S105. Therefore, the public telephone 100 is then used as a general public telephone.

In step S104, if it is determined that the cash service function is selected, the process proceeds to step S106 and the central processing unit 106 communicates with the interfacing part 109 and requests to open the communicating circuit 110. The communicating circuit 110 controls the telephone network controlling part 113 and opens the PSTN (public switched telephone network) 111. Thus, the public telephone 100 is then connected with the server of a banking agency at step S106.

The process then proceeds to step S107, and it is determined whether the card 103a inserted by the user is available for a requested cash service function at step S107 and S108. In this regard, first, the card reader 108 reads information recorded in the card 103a. The information read by the card reader 108 is transmitted through the communicating circuit 110 to the server of the banking agency. Then, the central processing unit 106 waits for a result of a reference from the server of the banking agency as to the acceptance or authorization of the requested cash service function. After that, if the result of the reference is received, the result is transmitted through the interfacing part 109 to the central processing unit 106. Then, the central processing unit 106 determines whether the requested cash service function should be performed. If it is determined that the card 103a is not available according to the result of the reference, the process proceeds to step S109 and the central processing unit 106 displays a message showing that the card 103a is not available on the displaying part 102 at step S109. Then, the process proceeds to step S102, and the public telephone 100 is switched to the standby mode at step S102.

However, in step S108, if it is determined that the card 103a is available for the requested cash service function, the process proceeds to step S110, and the central processing unit 106 displays an input window for inputting of a withdrawal amount by the user on the displaying part 102 at step S110.

The process then proceeds to step S111, and the central processing unit 106 checks whether the input operation of inputting of the withdrawal amount by the user through the inputting part 101 is completed at S111. If not, the process returns to step S110. If the input operation is completed, the process proceeds to step S112, and information as to the withdrawal amount is transmitted to the controlling part 202 in the cash or bill paying or discharging device 200, and to the server of banking agency at step S112 so as to perform the cash service corresponding to the requested cash service function in accordance with the authorization or acceptance of the requested cash service function.

Then, the central processing unit 106 checks whether a payment operation through the cash or bill paying or discharging device 200 is completed at step S113 and, if not, the process remains at step S113. If the payment operation is completed, the process proceeds to step S114, and the printer 107 outputs a receipt 107a, including the contents of a paying amount or amount paid and a paying date, etc. for the cash service. Then, the card 103a inserted by the user is discharged to the outside of the public telephone 100 at step S115. The process then ends, and the central processing unit 106 is switched to an initial mode.

Continuing now with reference to FIG. 4, FIG. 4 illustrates the process and operation of the cash or bill paying or discharging device 200 in the above described process of FIG. 3. In FIG. 4, the process proceeds with the controlling part 202 in the cash paying device 200 checking whether a request for cash payment is received from the central processing unit 106 at step S116. If the request for cash payment is not received from the central processing unit 106, the process proceeds to step S117 and the controlling part 202 maintains the standby mode at step S117.

If the request for cash payment is received from the central processing unit 106, the process proceeds to step S118, and the controlling part 202 receives information as to the withdrawal amount from the central processing unit 106 at step S118, and then controls the counting part 204 to pick up and count the bills stored in the currency cassette 203 in the withdrawal amount input by the user at step S119 in accordance with the authorization or acceptance of the requested cash service function.

Then, the process proceeds to step S120 and the controlling part 202 discharges the bills counted by the counting part 204 through the bill discharging port 201 at step S120. Preferably, the counting part 204 includes a pick-up part 204a for picking up the bills from the currency cassette 203, and a loading part 204b for discharging the counted bills through the bill discharging port 201, as illustrated in FIG. 2.

If the paying operation is completed by the process described above, the process proceeds to step S121, and the controlling part 202 transmits a completion signal to the central processing unit 106. The public telephone 100 is then switched to the initial mode, and the process ends. The cash service according to the present invention can be performed in various ways. For example, the user can draw a desired amount of money from his own bank account which is connected with the server of the banking agency, or the user can receive a loan from the bank if the balance in his account is not sufficient, or the user can receive the cash service from a banking agency with which the user does not have an account, and then the banking agency collects the loan from the user's account in the bank or can directly demand the payment of the user.

Further, if there is a limitation on a credit rating of the user and a withdrawal limit for a single transaction, the cash service can be performed in accordance with such limitation. Therefore, if the user tries to overdraw in excess of the limitation, the public telephone 100 for the requested cash service function does not pay the amount input by the user or only pays an amount within such limitation.

The above process can also include other steps for a cash service such as, for example, a step of requesting input of a user's secret number or password, and a step of transmitting the secret number or password to the server of the banking agency to identify the card, and so forth.

Figure 5:
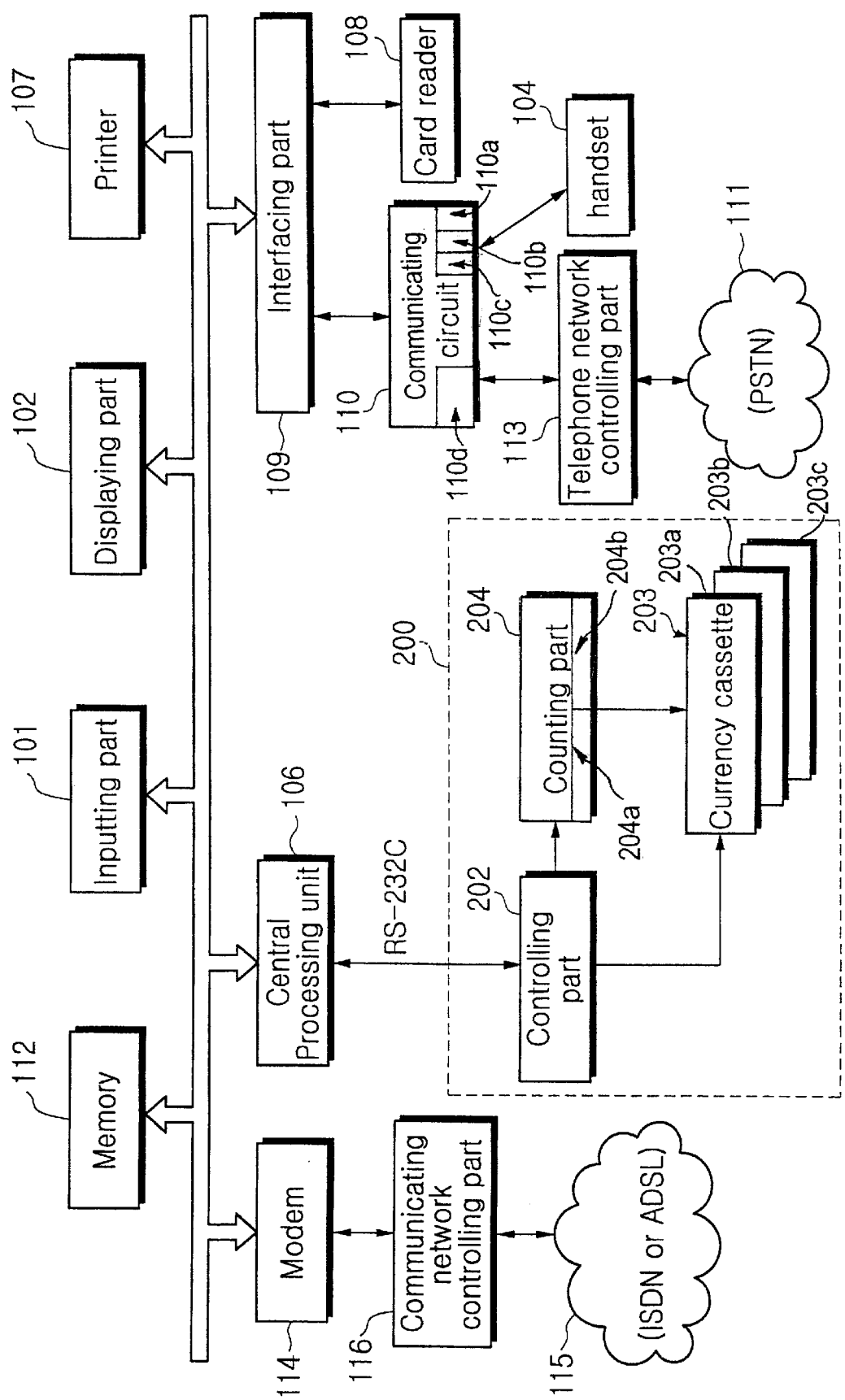
FIG. 5 is a block diagram showing a structure of a second embodiment of the public telephone with a cash payment function according to the present invention.

In the above described first embodiment of the present invention, the general public telephone function and the cash service function are performed using the telephone network or PSTN 111. However, in another embodiment of the present invention as illustrated in FIG. 5, the connection with the server of the banking agency is performed through a communicating network 115. The telephone network or PSTN 111 can therefore be advantageously used only for the general telephone function, while the cash service function can be performed using the communicating network 115.

Continuing with reference to FIG. 5, as shown in FIG. 5, the system according to the second embodiment of the present invention includes a modem 114, the communicating network (e.g., ISDN(integrated service digital network) or ADSL(asymmetric digital subscriber line)) 115, a communicating network controlling part 116, and the other elements in FIGS. 1 and 2, as described previously.

For the embodiment of FIG. 5, when the public telephone 100 is connected through the communicating network 115 to the server of a banking agency, the modem 114 modulates the information of the card 103a inserted by the user into a digital signal. Further, the modem 114 also performs a demodulating function of correcting errors in the information of whether the card 103a is available and other information for a requested cash service function. The communicating network controlling part 116 interfaces the modem 114 with the communicating network 115.

According to the construction as described above for the embodiment illustrated in FIG. 5, the entire operating process for the embodiment of FIG. 5 is substantially the same as the process previously described for FIGS. 3 and 4 for the first embodiment of FIG. 2. However, this second embodiment of FIG. 5 is different from the first embodiment of FIG. 2 in that the information transmitting/receiving operation and the operation of connecting with the server of the banking agency are performed through the communicating network 115. Therefore, in the embodiment of FIG. 5, since the communication network 115 is used, the maintenance fee or cost can be increased as compared with the first embodiment of FIG. 2. However, the embodiment of FIG. 5 is advantageous in that the general telephone function and the cash service function can be simultaneously performed.

Figure 6:
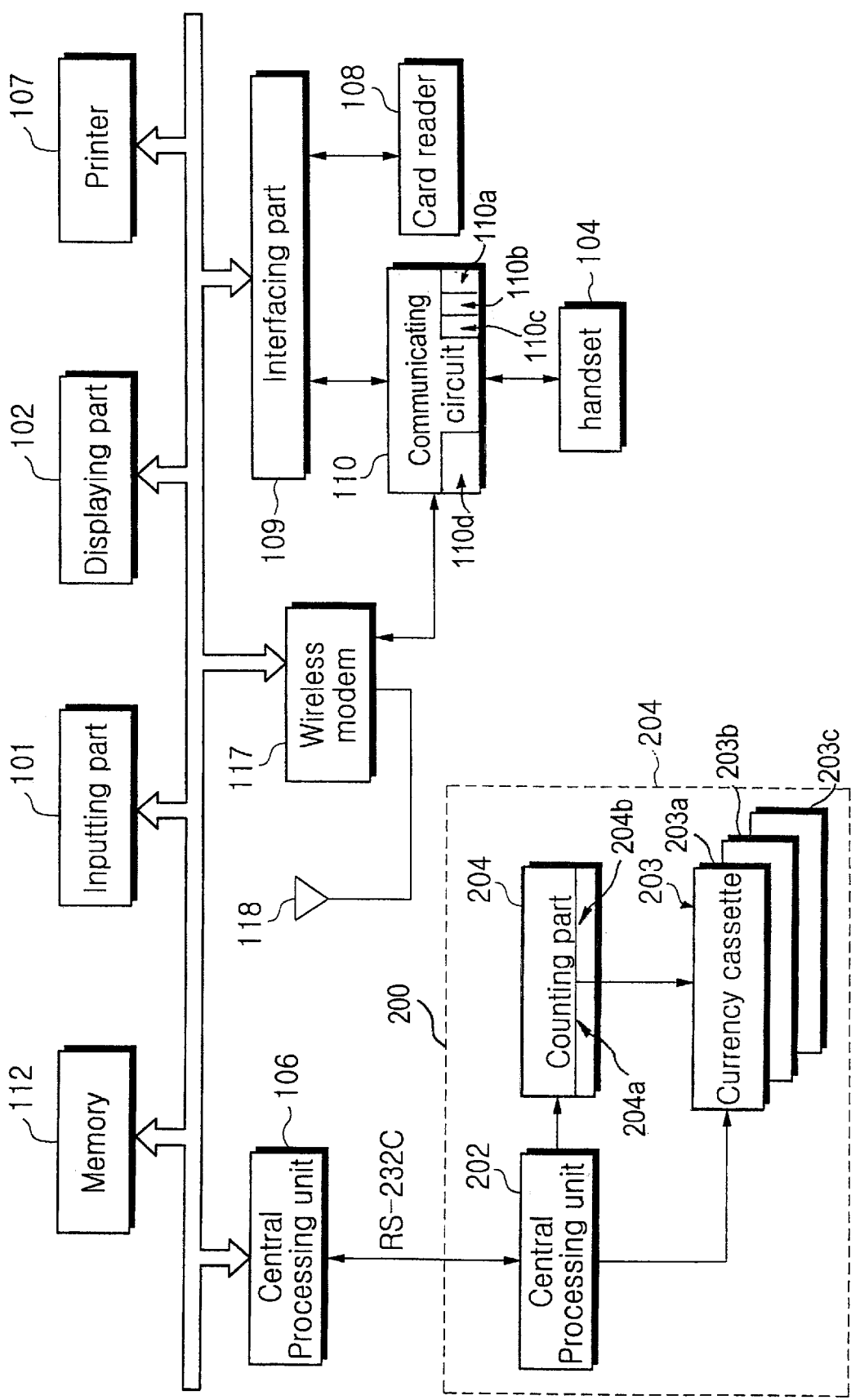
FIG. 6 is a block diagram showing a structure of a third embodiment of the public telephone with a cash payment function according to the present invention.

Continuing with reference to FIG. 6, a third embodiment of the present invention is illustrated. In this embodiment, a wireless modem 117 is used in performing the cash service function and the general public telephone service function. Therefore, the public telephone 100 according to the third embodiment of FIG. 6 of the present invention can advantageously provide the cash service and the general public telephone service within a transporting means, such as an airplane or a ship.

As shown in FIG. 6, also with reference to FIG. 1, when the public telephone 100 is connected through an antenna 118 of the wireless modem 117 to the server of a banking agency, the wireless modem 117 modulates the information of the card 103a inserted by the user into a digital signal. The wireless modem 117 also performs a demodulating function to correct errors in the information as to whether the card 103a is available and other information related to a requested cash service function. Further, the wireless modem 117 also modulates/demodulates voice data to perform the general telephone function.

The operating process for the embodiment of FIG. 6 is substantially the same as the process previously described for FIGS. 3 and 4 for the embodiment of FIG. 2. However, according to the third embodiment of FIG. 6, the general telephone function and the cash service function are performed through the communicating circuit 110 and the wireless modem 117. That is, the voice data and the information of the card 103a inserted by the user, which are modulated by the wireless modem 117, are transmitted through the antenna 118 to a wireless station and the server of the banking agency. Voice data and responding data from the wireless station and the server of the banking agency are received and demodulated through the antenna 118 in the wireless modem 117 and are transmitted to the interfacing part 109 and the card reader 108, thereby performing the general telephone function and the cash service function.

Further, according to the third embodiment of FIG. 6, the maintenance fee or cost can be increased as compared with the first embodiment of FIG. 2 and the second embodiment of FIG. 5. However, the embodiment of FIG. 6 is very useful from the viewpoint that the user can receive the general telephone function and the cash service function in a ship or an airplane.

In summary, as described above, the public telephone 100 with a cash payment function of the present invention according to the respective embodiments of FIGS. 2, 5 and 6 provides various respective advantages.

In this regard, since the cash payment function is added to the public telephone which can be provided at a variety of places over a wide area, increased convenience is offered to the user. Further, since the public telephone with a cash payment function of the present invention can use the PSTN instead of the exclusive line, the maintenance cost can be lowered. Also, since the public telephone with a cash payment function of the present invention can use a wireless modem, the user can advantageously receive the general telephone function and the cash service in a transporting means, such as a ship or an airplane.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the scope thereof. Therefore, it is intended that the present invention not be limited to the particular embodiments disclosed as the best mode contemplated for carrying our the present invention, but that the present invention include all embodiments falling within the scope of the appended claims.

What is claimed is:

1. A public telephone for providing a user with a capability of selectively placing a telephone call in accordance with a general public telephone function and performing a cash payment function, comprising:
    an inputting part for selectively inputting information for a cash service function requested by a user and for the general public telephone function;
    a displaying part for selectively displaying a present operating state of the public telephone, and information for the cash service function and for the general public telephone function;
    a printer for outputting information for a cash service corresponding to the cash service function requested by the user;
    a card reader for reading information from a card inserted into the public telephone, and for adjusting an amount charged to the card;
    a communicating circuit for allowing the public telephone to perform the general public telephone function;
    an interfacing part for selectively interfacing an input state and an output state between the card reader and the communicating circuit;
    a memory part for storing information, including programs for the public telephone;
    a telephone network controlling part for interfacing the communicating circuit with a telephone network;
    a central processing unit for controlling an operation of the public telephone while communicating with the interfacing part in accordance with a desired protocol, for connecting the public telephone to a server of a banking agency when the user selects the cash service function, for transmitting card information for the card, read by the card reader, to the server of the banking agency, and for controlling a cash paying device according to a response from the server of the banking agency; and
    a cash paying device for performing a cash paying function for the cash service corresponding to the cash service function requested by the user by means of a controlling operation of the central processing unit.

2. The public telephone according to claim 1, the cash paying device comprising a controlling part for controlling a cash paying operation for the cash service requested by the user, the controlling part communicating with the central processing unit for the cash paying operation, a currency cassette for holding currency for the cash paying operation, and a counting part for counting and dispensing currency stored in the currency cassette for the cash paying operation.

3. The public telephone according to claim 2, the communicating circuit including a communicating control part, a dual tone multiple frequency (DTMF) generating part, a modulating and demodulating part, and a line matching part.

4. The public telephone according to claim 1, the communicating circuit including a communicating control part, a dual tone multiple frequency (DTMF) generating part, a modulating and demodulating part, and a line matching part.

5. The public telephone according to claim 1, wherein the user uses the inputting part to enter a telephone number which the user wants to call in accordance with the general public telephone function.

6. The public telephone according to claim 5, wherein the communicating circuit carries out the general public telephone function by placing a call to the telephone number entered by the user.

7. A public telephone for providing a user with a capability of selectively placing a telephone call in accordance with a general public telephone function and performing a cash payment function, comprising:
    an inputting part for selectively inputting information for a cash service function requested by a user and for the general public telephone function;
    a displaying part for selectively displaying a present operating state of the public telephone, and information for the cash service function and for the general public telephone function;
    a printer for outputting information for a cash service corresponding to the cash service function requested by the user;
    a card reader for reading information from a card inserted into the public telephone, and for adjusting an amount charged to the card;

a communicating circuit for allowing the public telephone to perform the general public telephone function;

an interfacing part for selectively interfacing an input state and an output state between the card reader and the communicating circuit;

a memory part for storing information, including programs for the public telephone;

a modem for selectively modulating and demodulating information for the cash service function which is selectively transmitted and received through a communicating network selectively from and to the public telephone, and for controlling a respective transmitting state and a receiving state of the information selectively modulated and demodulated for the cash service function;

a communicating network controlling part for interfacing the modem with the communicating network;

a telephone network controlling part for interfacing the communicating circuit with a telephone network for the general public telephone function;

a central processing unit for controlling an operation of the public telephone, while communicating with the interfacing part in accordance with a desired protocol, for connecting the public telephone to a server of a banking agency when the user selects the cash service function, for transmitting card information for the card, read by the card reader, to the server of the banking agency, and for controlling a cash paying device according to a response from the server of the banking agency; and a cash paying device for performing a cash paying function for the cash service corresponding to the cash service function requested by the user by means of a controlling operation of the central processing unit.

8. The public telephone according to claim 7, the cash paying device comprising a controlling part for controlling a cash paying operation for the cash service requested by the user, the controlling part communicating with the central processing unit for the cash paying operation, a currency cassette for holding currency for the cash paying operation, and a counting part for counting and dispensing currency stored in the currency cassette for the cash paying operation.

9. The public telephone according to claim 8, the communicating circuit including a communicating control part, a dual tone multiple frequency (DTMF) generating part, a modulating and demodulating part, and a line matching part.

10. The public telephone according to claim 7, the communicating circuit including a communicating control part, a dual tone multiple frequency (DTMF) generating part, a modulating and demodulating part, and a line matching part.

11. The public telephone according to claim 7, wherein the user uses the inputting part to enter a telephone number which the user wants to call in accordance with the general public telephone function.

12. The public telephone according to claim 11, wherein the communicating circuit carries out the general public telephone function by placing a call to the telephone number entered by the user.

13. A public telephone for providing a user with a capability of selectively placing a telephone call in accordance with a general public telephone function and performing a cash payment function, comprising:

an inputting part for selectively inputting information for a cash service function requested by a user and for the general public telephone function;

a displaying part for selectively displaying a present operating state of the public telephone, and information for the cash service function and for the general public telephone function;

a printer for outputting information for a cash service corresponding to the cash service function requested by the user;

a card reader for reading information from a card inserted into the public telephone, and for adjusting an amount charged to the card;

a communicating circuit for allowing the public telephone to perform the general public telephone function;

an interfacing part for selectively interfacing an input state and an output state between the card reader and the communicating circuit;

a memory part for storing information, including programs for the public telephone;

a wireless modem for selectively modulating and demodulating voice data for the general public telephone function and information for the cash service function which is selectively transmitted and received through an antenna selectively from and to the public telephone, the wireless modem selectively transmitting and receiving the information for the cash service function selectively from and to the public telephone and a server of a banking agency, and selectively controlling a transmitting state and a receiving state of the information for the cash service function through the antenna;

a central processing unit for controlling an operation of the public telephone, while communicating with the interfacing part in accordance with a desired protocol, for connecting the public telephone to the server of the banking agency when the user selects the cash service function, for transmitting card information from the card, read by the card reader, to the server of the banking agency, and for controlling a cash paying device according to a response from the server of the banking agency; and a cash paying device for performing a cash paying function for the cash service corresponding to the cash service function requested by the user by means of a controlling operation of the central processing unit.

14. The public telephone according to claim 13, the cash paying device comprising a controlling part for controlling a cash paying operation for the cash service requested by the user, the controlling part communicating with the central processing unit for the cash paying operation, a currency cassette for holding currency for the cash paying operation, and a counting part for counting and dispensing currency stored in the currency cassette for the cash paying operation.

15. The public telephone according to claim 14, the communicating circuit including a communicating control part, a dual tone multiple frequency (DTMF) generating part, a modulating and demodulating part, and a line matching part.

16. The public telephone according to claim 13, the communicating circuit including a communicating control part, a dual tone multiple frequency (DTMF) generating part, a modulating and demodulating part, and a line matching part.

17. The public telephone according to claim 13, wherein the user uses the inputting part to enter a telephone number which the user wants to call in accordance with the general public telephone function.

18. The public telephone according to claim 17, wherein the communicating circuit carries out the general public telephone function by placing a call to the telephone number entered by the user.

19. A method for providing a user with a capability of selectively placing a telephone call in accordance with a general public telephone function and performing a cash payment function in a public telephone, comprising the steps of:

selectively inputting information into the public telephone for a cash service function requested by a user and for the general public telephone function;

selectively displaying a present operating state of the public telephone, and information for the cash service function and for the general public telephone function;

outputting information for a cash service corresponding to the cash service function requested by the user;

reading information from a card inserted into the public telephone for cash service corresponding to the cash service function requested by the user;

controlling an operation of the public telephone, and connecting the public telephone to a server of a banking agency when the user selects the cash service function;

transmitting card information, read from the card inserted into the public telephone, to the server of the banking agency for the cash service corresponding to the cash service function requested by the user; and controlling a cash paying device for the public telephone for performing a cash paying function for the cash service corresponding to the cash service function requested by the user according to a response from the server of the banking agency.

20. The method according to claim 19, wherein the step of selectively inputting information into the public telephone comprises entry by the user of a telephone number that the user wants to call in accordance with the general public telephone function.

21. The method according to claim 20, wherein the step of controlling the operation of the public telephone comprises placing a telephone call to the telephone number entered by the user.

22. A method for providing a user with a capability of selectively placing a telephone call in accordance with a general public telephone function and performing a cash payment function in a public telephone, comprising the steps of:

selectively inputting information into the public telephone for a cash service function requested by a user and for the general public telephone function;

selectively displaying a present operating state of the public telephone and information for the cash service function and for the general public telephone function;

outputting information for a cash service corresponding to the cash service function requested by the user;

reading information, from a card inserted into the public telephone, for the cash service corresponding to the cash service function requested by the user;

selectively modulating and demodulating, by means of a modem, information for the cash service corresponding to the cash service function requested by the user which is selectively transmitted and received through a communicating network selectively from and to the public telephone;

controlling an operation of the public telephone, and connecting the public telephone to a server of a banking agency when the user selects the cash service function;

transmitting card information, read from the card, to the server of the banking agency for the cash service corresponding to the cash service function requested by the user; and controlling a cash paying device for performing a cash paying function for the cash service corresponding to the cash service function requested by the user according to a response from the server of the banking agency.

23. The method according to claim 22, wherein the step of selectively inputting information into the public telephone comprises entry by the user of a telephone number that the user wants to call in accordance with the general public telephone function.

24. The method according to claim 23, wherein the step of controlling the operation of the public telephone comprises placing a telephone call to the telephone number entered by the user.

25. A method for providing a user with a capability of selectively placing a telephone call in accordance with a general public telephone function and performing a cash payment function in a public telephone, comprising the steps of:

selectively inputting information into the public telephone for a cash service function requested by a user and for the general public telephone function;

selectively displaying a present operating state of the public telephone and information for the cash service function and for the general public telephone function;

outputting information for a cash service corresponding to the cash service function requested by the user;

reading information, from a card inserted into the public telephone, for the cash service corresponding to the cash service function requested by the user;

selectively modulating and demodulating, by means of a wireless modem, voice data for the general public telephone function and information for the cash service corresponding to the cash service function requested by the user for selective transmission and reception through an antenna selectively from and to the public telephone, the wireless modem selectively transmitting and receiving the information for the cash service corresponding to the cash service function requested by the user selectively from and to the public telephone and a server of a banking agency;

controlling an operation of the public telephone, and connecting the public telephone to the server of the banking agency when the user selects the cash service function;

transmitting card information, read from the card, to the server of the banking agency for the cash service corresponding to the cash service function requested by the user; and controlling a cash paying device for performing a cash paying function for the cash service corresponding to the cash service function requested by the user according to a response from the server of the banking agency.

26. The method according to claim 25, wherein the step of selectively inputting information into the public telephone comprises entry by the user of a telephone number that the user wants to call in accordance with the general public telephone function.

27. The method according to claim 26, wherein the step of controlling the operation of the public telephone comprises placing a telephone call to the telephone number entered by the user.

* * * * *